United States Patent Office 3,780,128
Patented Dec. 18, 1973

3,780,128
**SYNTHETIC LUBRICANTS BY OLIGOMERIZA-
TION AND HYDROGENATION**
Ronald L. Shubkin, Oak Park, Mich., assignor to
Ethyl Corporation, Richmond, Va.
No Drawing. Filed Nov. 3, 1971, Ser. No. 195,443
Int. Cl. C07c 5/02
U.S. Cl. 260—683.9      19 Claims

ABSTRACT OF THE DISCLOSURE

Oligomers of normal —$C_{6-16}$ alpha-olefins as lubricants can be made by reacting $C_{6-16}$ normal-alpha-olefins or mixtures thereof at a temperature of from about 10–60° C. using an alcohol-promoted boron trifluoride catalyst in which boron trifluoride is used in molar excess of the alcohol. Preferably, additional boron trifluoride is injected into the reaction liquid phase during the course of the oligomerization. Stability of the resultant product is improved by catalytic hydrogenation. The products have a low pour point and high viscosity index.

Olefin oligomers have been used in the past as synthetic lubricants. Seger et al, U.S. 2,500,161, describes a process for making such synthetic lubricants by polymerizing 1-olefins using a lead tetraacetate catalyst. Garwood, U.S. 2,500,163, describes similar synthetic lubricants made by polymerizing 1-olefins using phosphorus sulfide catalysts. Hydrogenation of such olefin oligomers to improve their stability is also well known. Reid, U.S. 2,360,446, describes blends of mineral oil and synthetic olefin polymers in which the olefin polymer is hydrogenated to improve its resistance to oxidation and chemical change. Hamilton, U.S. 3,149,178, describes oligomers made from alpha-olefins using peroxide, Friedel-Crafts or thermal catalysis. In accordance with Reid, their stability is improved by hydrogenation. As discussed in Hamilton et al, this hydrogenation, though improving the oligomer stability, unfortunately causes a sharp increase in pour point. In Hamilton et al this problem was minimized by distilling out the dimer content of the olefin oligomer to obtain a dimer-free product. It has now been discovered that the increased pour point of hydrogenated oligomers can be avoided without the necessity of resorting to a distillation step to obtain dimer-free product. By the present invention, oligomers of normal-alpha-olefins are made which have a pour point after hydrogenation which is not substantially higher than that exhibited by the same oligomer from which dimer has been distilled.

An object of the invention is to provide an improved synthetic lubricant. A further object is to provide a lubricant having a high viscosity index. Another object is to provide a lubricant having a very low pour point. A still further object is to provide a process for making such synthetic lubricants which does not require removal of olefin dimer in order to achieve the required low pour point.

SUMMARY

The above and other objects of the present invention are accomplished by providing a process for oligomerizing a $C_{6-16}$ normal-alpha-olefin monomer or mixtures thereof by reacting the olefin monomer at a temperature of from about 10–60° C. using as a catalyst an alcohol-promoted boron trifluoride. The amount of boron trifluoride used in the oligomerization is in molar excess of the amount of alcohol promoter. A highly preferred means of accomplishing this is to add boron trifluoride to the olefin monomer reaction mixture containing the alcohol co-catalyst until the oligomerization initiates and then to continue to add boron trifluoride during the course of the oligomerization. Following the oligomerization stage, the catalyst is removed and the reaction product hydrogenated catalytically to produce the useful synthetic lubricant compositions.

DESCRIPTION OF THE PREFERRED EMBODIMENTS

A preferred embodiment of the present invention is a process for producing a $C_{6-16}$ normal-alpha-olefin oligomer having a low pour point and high viscosity index suitable for use as a synthetic lubricant, said process comprising (a) reacting a $C_{6-16}$ normal-alpha-olefin or mixture of such olefins at a temperature of from about 10–60° C. using a catalytic amount of boron trifluoride as a catalyst and a promoter amount of an alcohol co-catalyst, said boron trifluoride being present in a molar excess of said alcohol thereby producing an olefin oligomer, and (b) catalytically hydrogenating said olefin oligomer to form a substantially saturated product.

The olefin used in making the oligomer are straight chain monoolefinically unsaturated hydrocarbons in which the olefinic unsaturation occurs at the 1- or alpha position of the straight carbon chain. Such alpha-olefins are commercially available and can be made by the thermal cracking of paraffinic hydrocarbons or by the well-known Ziegler ethylene chain growth and displacement on triethyl aluminum. Superior lubricants result when the olefin monomers contain from about 6–16 carbon atoms. Individual olefins may be used as well as mixtures of such olefins. Examples of such olefins are 1-hexene, 1-heptene, 1-octene, 1-nonene, 1-decene, 1-dodecene, 1-tetradecene, and 1-hexadecene. The more preferred normal-alpha-olefin monomers are those containing about 8–12 carbon atoms. The most preferred olefin monomer is 1-decene.

When mixtures of alpha-olefins are used it is preferred that the mole average chain length be from about 8–12 carbon atoms. Mole average chain length is determined by multiplying the number of carbon atoms of each specie in the mixture by the mole fraction of that specie present and then adding the products. For example, the mole average chain length of a mixture of one mole of 1-hexene, 2 moles of 1-octene, 6 moles of 1-decene, and one mole of 1 - dodecene is $(0.1\times6)+(0.2\times8)+(0.6\times10)+(0.1\times12)$, or 9.4.

The alcohol co-catalyst can be any alcohol capable of complexing with boron trifluoride to form an active catalyst specie. Boron trifluoride itself is a rather poor polymerization catalyst and, in fact, polymerization will generally not proceed to any extent at the moderate conditions of the present invention.

Preferred alcohols are those containing from about 1 to about 30 carbon atoms. Examples of these are methanol, ethanol, ethyleneglycol, isopropanol, n-propanol, propyleneglycol, glycerol, n-butanol, tert-butanol, sec-butanol, n-pentanol, isopentanol, n-hexanol, cyclohexanol, and the various isomers of octanol, decanol, dodecanol, hexadecanol, octadecanol, eicosanol, docosanol, tetracosanol, hexacosanol, octacosanol, triacontanol, and the like, including mixtures thereof. Of the foregoing, the more preferred co-catalysts are the monohydric alkanols containing from about 1–30 carbon atoms. An especially preferred co-catalyst is n-propanol.

The amount of alcohol used to conduct the polymerization need only be a promoter amount. This is the amount which when used together with boron trifluoride causes the reaction to proceed at a reasonable rate. This is readily determined experimentally because, as mentioned above, boron trifluoride alone is not an effective catalyst under the present reaction conditions. Good results are obtained using from about 0.1 to about 10 parts of alcohol per 100 parts of normal-alpha-olefin monomer. A preferred range is from about 0.25 to 5 parts per 100 parts of monomer.

The amount of boron trifluoride used in the process should be a catalytic amount. This is an amount which when used in the presence of the alcohol co-catalyst will cause the reaction to proceed at a reasonable rate. A useful range of boron trifluoride is from about 0.15 to 15 parts per 100 parts of olefin monomer. A preferred range is from about 0.3 to about 7 parts per 100 parts of olefin monomer.

The actual catalyst specie forms from the interaction between boron trifluoride and the alcohol co-catalyst. For this reason, whenever reference is made to the use of the alcohol-promoted boron trifluoride or that the reaction is carried out in its presence, it is meant that the actual catalyst specie that is used and in the presence of which the reaction is conducted is the specie that forms in the oligomerization system when boron trifluoride and the alcohol co-catalyst are added to the system in the manner prescribed. In order to form the proper catalyst specie which is necessary to achieve the objectives of the present invention it is required that the boron trifluoride be added to the reaction system in molar excess of the alcohol. When less than a molar equivalent is used, either the oligomerization does not proceed at all under the reaction conditions, or proceeds in a different manner producing an oligomer which does not have a satisfactory pour point after hydrogenation without the distillation step disclosed in U.S. 3,149,178.

The molar excess of boron trifluoride in the system can be achieved in a number of ways. One way is to add the alcohol co-catalyst to the alpha-olefin monomer and then add a molar excess of boron trifluoride in a closed system. The molar excess of boron trifluoride is assured by conducting the reaction under a boron trifluoride pressure of from about 5–500 p.s.i.g.

A preferred way to conduct the oligomerization is to merely inject boron trifluoride during the course of the oligomerization into the liquid reaction media to which has been added the alcohol co-catalyst. The boron trifluoride may be continuously bubbled into the reaction phase during the course of the reaction or may be injected periodically. The system need not be maintained under pressure and, in fact, good results are achieved by carrying out the oligomerization at atmospheric pressure, allowing excess boron trifluoride gas to vent. It is generally preferred when using this supplemental boron trifluoride technique to conduct the oligomerization under moderate pressure of from about 1–15 p.s.i.g. Whenever the pressure exceeds the desired limit due to the injection of additional boron trifluoride into the liquid phase, the vapor phase is vented at a controlled rate to maintain the desired pressure, either atmospheric or superatmospheric. The vent gas, whether the reaction is carried out under superatmospheric or atmospheric pressure, consists mainly of boron trifluoride which may be readily recycled back into the liquid reaction phase so that in effect a closed boron trifluoride loop is formed.

The oligomerization is readily conducted by placing the normal-alpha-olefin monomer in a reaction vessel and adding to it the alcohol co-catalyst and boron trifluoride. The alcohol co-catalyst may be in the form of a boron trifluoride alcohol complex or may consist only of the alcohol. The addition of the alcohol in the form of a boron trifluoride complex is not sufficient in itself to achieve the low pour point oligomers of this invention. Such complexes do not normally contain sufficient boron trifluoride to provide the required molar excess. Oligomerizations attempted in this manner usually do not react under the prescribed reaction conditions, and when they do, lead to products that when hydrogenated have an unacceptably high pour point. This failure of the usual boron trifluoride alcohol complex to yield the desired product will be shown in later examples. In order to achieve the desired results, it is required to add boron trifluoride in addition to the amount normally contained in a preformed alcohol-boron trifluoride complex. A explained previously, this may be accomplished by adding boron trifluoride to a closed oligomerization system or by injecting it into the liquid reaction phase during the course of the oligomerization. For this reason, it is not necessary to add the alcohol co-catalyst as a preformed boron trifluoride complex. One practical advantage of so doing is that when the alcohol is added in the form of a boron trifluoride complex and additional boron trifluoride is then introduced into the system the desired oligomerization reaction will initiate in a shorter time period than when the alcohol is added alone followed by the injection of boron trifluoride.

The oligomerization reaction generally initiates shortly after the amount of boron trifluoride added to the system is in molar excess over the alcohol co-catalyst. The reaction should be allowed to proceed until a good conversion of monomer to oligomer is achieved. In most cases this is accomplished in from about 1–4 hours. Conversion of the normal-alpha-olefin to oligomer is generally in excess of 90 percent. In fact, in most cases there is so little monomer left in the reaction mixture (on the order of 1–3 percent) that it need not even be distilled out prior to catalytic hydrogenation. In other words, the entire reaction mass can be merely treated to remove oligomerization catalyst and then hydrogenated to yield a useful lubricant. If even a small amount of unconverted monomer is undesirable because of, for example, flash point limits on the product, it can readily be distilled out of either the oligomerization reaction product or the final hydrogenated lubricating oil.

The reaction temperature should be high enough such that the reaction initiates and proceeds at a good rate, but not so high such that the final hydrogenated product has an unsatisfactory pour point. A useful temperature range is from about 10–60° C. Excellent results are generally achieved by maintaiing the oligomerization reaction within a temperature range of from about 20–30° C. during at least the major portion of the reaction period.

After the oligomerization is complete the catalyst can be removed by conventional methods. An advantage of using a lower alcohol co-catalyst such as a $C_{1-4}$ alkanol, e.g,. n-propanol, is that the catalyst system is insoluble in the reaction mixture and can be readily separated and used again in a subsequent oligomerization. In this embodiment the lower liquid catalyst phase is merely removed and added to another normal-alpha-olefin charge and the subsequent oligomerization carried out in the same manner as the first, that is, by injecting additional boron trifluoride into either a vented or closed system. Alternatively, the upper oligomer phase can be drawn off leaving the catalyst phase in the reaction vessel and a new charge of normal-alpha-olefin monomer added to this same reaction vessel.

Higher alcohol co-catalysts such as n-decanol form a homogeneous catalyst system with boron trifluorode. These can be washed out with water. In either case, it is preferable to wash and dry the oligomer prior to catalytic hydrogenation.

The process does not require a solvent, although an inert solvent can be used if desired. Saturated aliphatic hydrocarbons containing from about 5–10 carbon atoms are satisfactory. The lower hydrocarbon solvents such as pentane can also function to control reaction temperature. The preferred way to conduct the reaction is in the absence of solvent since this simplifies product recovery.

The oligomers can be hydrogenated by standard means. It is merely placed in a pressure vessel together with a hydrogenation catalyst and pressurized with hydrogen under hydrogenation conditions. Useful catalysts include platinum supported on charcoal, palladium supported on charcoal, Raney nickel, nickel on kieselguhr, copper chromite, alumina supported copper and palladium, and the like. Pressures can vary over a wide range depending upon catalyst activity. A useful hydrogenation pressure range is from 100–2000 p.s.i.g. Temperature can also vary widely depending upon catalyst and hydrogen pressure. A useful range is from about 50–300° C., especially from about 150–200° C. The hydrogenation should be conducted until the product is substantially completely saturated. The degree of unsaturation can be monitored by determining iodine number. A satisfactory lubricant should have an iodine number below about 1.0, and preferably below about 0.2.

The synthetic oligomers made by the present invention have desirable lubricant properties. The absolute value of viscosity will vary somewhat depending upon the number of carbon atoms in the starting monomer. Typical physical properties are:

| | |
|---|---|
| Viscosity at 100° F. (cs.) | 10–55 |
| Viscosity at 210° F. (cs.) | 3–15 |
| Viscosity index | 120–160 |
| Pour point (° F.) | <−50° |

An important feature of the present invention is that it results in a substantially saturated normal-alpha-olefin oligomer lubricant which has a pour point below about −50° C. without resorting to a distillation step to remove dimer as taught by U.S. 3,149,178. The products having the above typical properties are obtained by merely conducting the oligomerization process in the manner prescribed without distilling out dimer. Of course, if it is desired to distill out the dimer to obtain a dimer-free product, this is not detrimental, but generally unnecessary. Typical product composition is a hydrogenated substantially saturated oligomer of $C_{6-16}$ normal-alpha-olefins consisting essentially of from about 2–10 weight percent dimer, about 50–85 weight percent trimer, and the remainder tetramers and higher oligomers. It has been found that these particular compositions have the required low pour point property without subjecting them to distillation to obtain a dimer-free product.

The following examples serve to illustrate the manner in which the present process is carried out and also to compare the results obtained to those obtained from similar procedures outside the scope of the present invention. All parts are by weight unless otherwise indicated.

Example 1

This experiment was conducted using a preformed boron trifluoride n-propanol complex as the catalyst without adding additional boron trifluoride during the course of the reaction.

Gaseous boron trifluoride was bubbled through n-propanol for about 20 minutes. Following this, 10 ml. of this solution was added to 50 ml. of 1-decene in a reaction vessel and the mixture stirred vigorously at 25° C. The temperature rose slowly to 32° C. After 30 minutes, an additional 10 ml. of boron trifluoride n-propanol complex was added and stiring continued. Temperature rose to 48° C. and was then cooled to 25° C. After 2 hours, gas chromatography showed that no monomer remained in the mixture. The product consisted essentially of 30 percent dimer and 70 percent trimer.

It should be noted that in the above example a large amount of preformed boron trifluoride n-propanol complex was required. The reason for this is that in a previous experiment carried out in a similar manner, but using only 10 ml. of the preformed catalyst per 200 ml. of 1-decene, there was substantially no reaction after 18 hours starting at 20–25° C. It was necessary to heat this reaction to 100° C. for 2 hours to finally obtain conversion to a product which was about 50 percent dimer and 50 percent trimer. From the above, it is apparent that the oligomerization of a typical normal-alpha-olefin catalyzed with a preformed boron trifluoride alcohol complex such as used in the prior art forms an oligomer containing a large amount of dimer which presumably would have to be distilled out in order to obtain a hydrogenated saturated synthetic lubricant having a suitably low pour point.

Example 2

This example shows that boron trifluoride alone is an ineffective catalyst under the prescribed reaction conditions.

In a reaction vessel was placed 50 parts of 1-decene. While stirring vigorously, boron trifluoride gas was injected into the liquid for 30 minutes at 25° C. Stirring was continued for 3 hours. At this time, gas chromatographic analysis showed that no reaction had occurred.

Example 3

This example illustrates the entirely different results obtained when a reaction similar to Example 1 is carried out according to the present invention.

In a reaction vessel was placed 200 parts of 1-decene and 2 parts of n-propanol. While stirring, boron trifluoride gas was continuously bubbled through the mixture. Temperature was maintained at 25–32° C. using an ice bath. This procedure was continued for 2 hours. The product was then washed twice with 50 parts of 15 percent hydrochloric acid and then with 50 parts of 10 percent aqueous sodium carbonate. The product was dried over anhydrous calcium sulfate and filtered. Gas chromatographic analysis showed essentially complete conversion of monomer to oligomer. The product was distilled at reduced pressure (0.2 mm. Hg) and found to contain

| | Weight percent |
|---|---|
| Dimer | 1.7 |
| Trimer | 54 |
| Tetramer and higher oligomers | 43.2 |

From the above, it can be seen that when the oligomerization is carried out using additional boron trifluoride above that which would normally complex with the alcohol co-catalyst the product obtained is completely different from that obtained using a standard boron trifluoride alcohol complex or using boron trifluoride alone.

EXAMPLE 4

This example illustrates that the hydrogenated oligomers made according to the present invention have the low pour point required of a synthetic lubricant without the necessity of removing dimer.

In a reaction vessel was placed 210 parts of 1-decene and 5 parts of a preformed boron trifluoride n-propanol complex. After stirring for 10 minutes at room temperature there was no indication of reaction. Injection of boron trifluoride gas into the liquid phase was started and the reaction initiated. Temperature was kept below 27° C. using an ice bath. After 10 minutes, boron trifluoride injection was stopped and the mixture stirred for 90 minutes. Gas chromatographic analysis showed the composition to be 10 percent monomer, 10 percent dimer, and 80 percent trimer. Boron trifluoride gas was again injected into the stirred mixture and after a 20 minute induction period the reaction started again. The temperature rose to 35° C. After one hour, gas chromatography showed almost complete conversion to oligomer. The product was washed twice with water and dried over anhydrous calcium sulfate.

The entire product was then transferred to a hydrogenation vessel. Ten parts of kieselguhr supported nickel hydrogenation catalyst was added and the oligomer hydrogenated at 220° C. and 900–1000 p.s.i.g. hydrogen for 10 hours. The product was filtered to remove catalyst, resulting in a clear colorless oil. The oil was stripped to remove residual monomer. A portion was then set aside for determination of physical properties. The remainder was distilled under vacuum to remove dimer (7.3 weight percent). The physical properties of the products, both with and without dimer, were determined to be as follows:

|  | With dimer | Dimer free |
|---|---|---|
| Viscosity: | | |
| 100° F. (cs.) | 19.97 | 22.72 |
| 210° F. (cs.) | 4.21 | 4.60 |
| Index | 127 | 131 |
| Pour point (° F.) | −80 | −80 |

As the above results show, the hydrogenated product from the present invention has an extremely low pour point whether dimer is removed or left in.

Example 5

This example illustrates the manner by which the process can be carried out in a closed system.

In an autoclave was placed 146 parts of 1-decene and 1.5 part of n-propanol. The vessel was flushed with nitrogen, sealed, and while stirring, pressurized with boron trifluoride at 19° C. Temperature rose rapidly to 60° C., at which temperature the pressure was 450 p.s.i.g. The vessel was allowed to cool over a 40-minute period to 27° C. (250 p.s.i.g.), resulting in an oligomer which when hydrogenated results in a useful synthetic lubricant.

Example 6

The following example illustrates the process carried out with a closed loop boron trifluoride recycle.

A reaction vessel is fitted with a stirrer, cooling jacket, gas injection tube extending to the bottom of the vessel, a vent line through a constant pressure valve, a compressor in the vent line, and a conduit from the discharge side of the compressor connected to the inlet of the gas injection tube. In the vessel is placed a mixture of 10 parts 1-hexene, 150 parts 1-octene, 400 parts 1-decene and 125 parts 1-dodecene. Then 10 parts of n-decanol is added and the vessel is closed and stirring started. Boron trifluoride gas is injected through the gas injection tube from an anhydrous boron trifluoride gas cylinder. The temperature is maintained between 25–30° C. The constant pressure valve in the vent line is set at 10 p.s.i.g. When the pressure reaches 10 p.s.i.g., the vent valve opens and allows gas to escape into the vent line at a rate which maintains the pressure in the vessel at 10 p.s.i.g. The escaping gas consists mainly of boron trifluoride and is compressed to about 15 p.s.i.g. and conducted back to the inlet of the gas injection tube. During the course of the reaction a small amount of make-up boron trifluoride from the gas cylinder is continuously added to the system in an amount such that there is a constant flow of gas through the boron trifluoride injection tube. The reaction is continued for 2 hours, at which time the addition of boron trifluoride is stopped and the reaction stirred for 30 minutes. The reaction mixture is then discharged to a wash vessel where it is washed twice with water and finally with 10 percent aqueous sodium carbonate. The resulting oligomer is dried by conducting it through an anhydrous calcium sulfate packed column. The dried product is placed in a high pressure hydrogenation autoclave and 50 parts of kieselguhr supported nickel hydrogenation catalyst is added. The autoclave is sealed, and while stirring, pressurized to 100 p.s.ig. with hydrogen. The autoclave is then heated to 200° C. and hydrogen pressure gradually increased to 1500 p.s.i.g. Stirring is continued under these conditions for 6 hours, at which time the autoclave is cooled and vented, resulting in a saturated olefin oligomer having physical properties making it ideally suited as a synthetic lubricant.

Examples 7–28

In these examples the following alcohols are substituted one at a time for the n-decanol co-catalyst employed in Example 6 and the rest of the procedure of Example 6 carried through in the same manner.

(7) methanol
(8) ethanol
(9) ethyleneglycol
(10) propyleneglycol
(11) n-butanol
(12) isobutanol
(13) n-pentanol
(14) cyclohexanol
(15) cyclooctanol
(16) n-octanol
(17) 2-ethyl hexanol
(18) 2-ethyl octanol
(19) tridecanol
(20) hexadecanol
(21) octadecanol
(22) eicosanol
(23) docosanol
(24) tricosanol
(25) tetracosanol
(26) hexacosanol
(27) octacosanol
(28) triacontanol The saturated oligomers of the present invention are useful as synthetic lubricants in such applications as automotive engines, diesel engines and in turbines including turbojet engines. They are especially useful under frigid conditions where a low pour point is important. They may be used as the sole lubricant or may be blended with mineral lubricating oils or with other synthetic lubricants such as synthetic ester lubricants, e.g., di-2-ethylhexyl adipate, trimethylolpropane tricaproate, and the like. Properties of the lubricants are improved by inclusion of known lubricant additives such as zinc dialkyldithiophosphates, calcium aryl sulfonates, overbased calcium aryl sulfonates, barium phenates, barium oxide neutralized reaction products of phosphorus pentasulfide, and terpenes or high molecular weight olefins, 4,4′-methylenebis-2,6-di-tert-butylphenol, dibutyl tin sulfide, dibutyl hydrogen phosphonate, tricresylphosphate, high molecular weight alkyl succinimides of ethylenepolyamines such as tetraethylenepolyamine, and the like. The following exampe illustrates the preparation of a lubricant suitable for use in spark ignited automotive engines.

Example 29

In a blending vessel is placed 10,000 parts of the hydrogenated olefin oligomer prepared in the manner described in Example 6. To this is added 70 parts of zinc isobutylhexyl dithiophosphate. Overbased calcium dodecyl benzene sulfonate (base No. 300) in an amount to provide 0.4 percent calcium and 300 parts of an alkenyl succinimide of a crude tetraethylenepentamine mixture in which the alkenyl group has an average molecular weight of 900 are added. The mixture is stirred until homogeneous and filtered to give a useful synthetic lubricant for automotive spark ignited engines.

The above lubricant can also be used in diesel engine lubrication, although it would be generally desirable to eliminate the use of the alkenyl succinimide dispersant and increase the amount of calcium dodecyl benzene sulfonate.

The synthetic lubricants are also very useful as a base stock for preparing grease. These are made by adding a sufficient amount, from about 5–25 percent, of a fatty acid soap to thicken the oil. Typical fatty acid soaps are lithium, sodium, and calcium salts of oleic acid, or crude mixtures containing such fatty acids.

The products also find use as functional fluids such as hydraulic fluid.

The following two examples compare the results obtained using a preformed boron trifluoride alcohol complex catalyst with those obtained using an excess of boron trifluoride according to the manner prescribed by the present invention.

Example 30

In this example the catalyst is a preformed boron trifluoride alcohol complex.

In the reaction vessel of Example 2 was placed 200 grams of 1-decene and 3 ml. of a boron trifluoride decanol complex prepared by bubbling boron trifluoride through decanol for about one hour. The mixture was vigorously stirred at 29° C. for 2 hours, at which time gas chromatographic analysis showed that no reaction had occurred. An additional 5 ml. of the above boron trifluoride decanol complex was added and stirring continued for 16 hours. After this period the reaction mixture consisted of 77 percent unreacted decene-1, 13 percent dimer, 8 percent trimer, and the balance higher oligomers.

Example 31

This example is carried out in a manner similar to Example 30 except with the addition of excess boron trifluoride.

In the reaction vessel of Example 2 was placed 200 grams of 1-decene and 3 ml. of the same boron trifluoride decanol complex employed in Example 30. The mixture was stirred at 24–29° C. while injecting boron trifluoride gas into the liquid phase. After 2 hours the mixture was washed with water, giving a product which analyzed 0.8 percent monomer, 9 percent dimer, 63 percent trimer and 26.5 percent tetramer. Hydrogenation of this oligomer yields a saturated synthetic lubricant having high viscosity index and exceptionally low pour point.

I clam:

1. A process for producing a substantially saturated $C_{6-16}$ normal-alpha-olefin oligomer having a pour point below about −50° F. and a viscosity index above about 120 and consisting essentially of from about 2 to about 10 weight percent dimer and from about 50 to 85 weight percent trimer, the balance being higher oligomers suitable for use as a synthetic lubricant, said process comprising (a) initially reacting a $C_{6-16}$ normal-alpha-olefin or mixture of such olefins at a temperature of from about 10–60° C. in the presence of a promoter amount of a boron trifluoride-free alcohol and injecting boron trifluoride into said normal-alpha-olefin during the course of the oligomerization in an amount in excess of the amount soluble in said normal-alpha-olefin to maintain boron trifluoride in molar excess of said alcohol in said normal-alpha-olefin to produce an olefin oligomer, and (b) catalytically hydrogenating said olefin oligomer to form a substantially saturated product.

2. A process of claim 1 conducted within a temperature range of from about 20–30° C.

3. A process of claim 1 wherein said alcohol is a $C_{1-30}$ alkanol.

4. A process of claim 3 wherein said alkanol is n-propanol.

5. A process for producing a substantially saturated $C_{6-16}$ normal-alpha-olefin oligomer having a pour point below about −50° F. and a viscosity index above about 120 and consisting essentially of from about 2 to about 10 weight percent dimer and from about 50 to about 85 weight percent trimer, the balance being higher oligomers suitable for use as a synthetic lubricant, said process comprising (a) initially reacting in the liquid phase a $C_{6-16}$ normal-alpha-olefin or mixture of such olefins within a temperature range of from about 10 to about 60° C. in the presence of about 0.1 to about 10 parts of a boron trifluoride-free alcohol per 100 parts of said normal, alpha-olefin and injecting boron trifluoride into said liquid phase during the course of the oligomerization in an amount in excess of the amount soluble in said normal-alpha-olefin to maintain boron trifluoride in molar excess of said alcohol in said liquid phase to produce an olefin oligomer, and (b) catalytically hydrogenating said olefin oligomer to form a substantially saturated product.

6. A process of claim 5 wherein said alcohol is a $C_{6-16}$ alkanol.

7. A process of claim 6 wherein said normal-alpha-olefin consists predominantly of 1-decene.

8. A process of claim 7 wherein said alcohol is n-propanol.

9. A substantially saturated olefin oligomer having a pour point below about −50° F. and a viscosity index above about 120 and consisting essentially of from about 2 to about 10 weight percent dimer and from about 50 to about 85 weight percent trimer, the balance being higher oligomers suitable for use as a lubricant made by the process comprising (a) initially reacting a $C_{6-16}$ normal-alpha-olefin or mixture of such olefins at a temperature of from about 10–60° C. in the presence of a promoter amount of a boron trifluoride-free alcohol and injecting boron trifluoride into said normal-alpha-olefin during the course of the oligomerization in an amount in excess of the amount soluble in said normal-alpha-olefin to maintain boron trifluoride in molar excess of said alcohol in said normal-alpha-olefin to produce an olefin oligomer, and (b) catalytically hydrogenating said olefin oligomer to form a substantially saturated product.

10. An olefin of claim 9 wherein said temperature range is from about 20 to about 30° C.

11. An olefin oligomer of claim 9 wherein said alcohol is a $C_{1-30}$ alkanol.

12. An olefin oligomer of claim 11 wherein said alkanol is n-propanol.

13. A substantially saturated olefin oligomer having a pour point below about −50° F. and viscosity index above about 120 and consisting essentially of from about 2 to about 10 weight percent dimer and from about 50 to about 85 weight percent trimer, the balance being higher oligomers suitable for use as a lubricant made by the process comprising (a) initially reacting in the liquid phase a $C_{6-16}$ normal-alpha-olefin or mixture of such olefins within a temperature range of from about 10 to about 60° C. in the presence of about 0.1 to about 10 parts of a boron alcohol per 100 parts of said normal-alpha-olefin and injecting boron trifluoride into said liquid phase in an amount in excess of the amount soluble in said normal-alpha-olefin to maintain boron trifluoride in molar excess of said alcohol in said liquid phase to produce an olefin oligomer, and (b) catalytically hydrogenating said olefin oligomer to form a substantially saturated product.

14. An olefin oligomer of claim 13 wherein said alcohol is a $C_{1-30}$ alkanol.

15. An olefin oligomer of claim 14 wherein said normal-alpha-olefin consists predominantly of 1-decene.

16. An olefin oligomer of claim 15 wherein said alkanol is n-propanol.

17. A process for producing a substantially saturated $C_{6-16}$ normal-alpha-olefin oligomer having a pour point below about −50° F. and a viscosity index above about 120 and consisting essentially of from about 2 to about 10 weight percent dimer and from about 50 to about 85 weight percent trimer, the balance being higher oligomers, said process comprising (a) injecting boron trifluoride into the liquid phase of said olefin containing a promoter amount of an initially boron trifluoride-free alcohol during the course of the oligomerization carried out at a temperature of about 10–60° C., said boron trifluoride being injected in an amount in excess of the amount soluble in said olefin to maintain boron trifluoride in molar excess of said alcohol in said liquid phase, (b) collecting the excess boron trifluoride which escapes from said liquid phase, (c) re-injecting said excess boron trifluoride as at least a part of said boron trifluoride forming a closed boron trifluoride loop, to form an olefin oligomer, and (d) catalytically hydrogenating said olefin oligomer to form a substantially saturated product.

18. A process of claim 17 wherein said normal-alpha-olefin is predominantly decene-1.

19. A process of claim 18 wherein said alcohol is n-propanol.

References Cited

UNITED STATES PATENTS

| | | | |
|---|---|---|---|
| 3,382,291 | 5/1968 | Brennan | 260—683.15 B |
| 2,360,446 | 10/1972 | Reid | 208—19 |
| 3,149,178 | 5/1967 | Hamilton et al. | 260—683.9 |
| 3,682,823 | 8/1972 | Smith et al. | 260—683.9 |

HERBERT LEVINE, Examiner

U.S. Cl. X.R.

252—59; 260—683.15 B

PO-1050
(5/69)

UNITED STATES PATENT OFFICE
CERTIFICATE OF CORRECTION

Patent No. 3,780,128            Dated   December 18, 1973

Inventor(s)   Ronald L. Shubkin

It is certified that error appears in the above-identified patent and that said Letters Patent are hereby corrected as shown below:

Column 9, in Claim 6, at line 63, "$C_{6-16}$" should read -- $C_{1-30}$ --. Column 10, in Claim 10, at line 11, insert "oligomer" after "olefin"; in Claim 13, at line 27, insert "trifluoride-free" after "boron".

Signed and sealed this 23rd day of April 1974.

(SEAL)
Attest:

EDWARD M.FLETCHER,JR.                C. MARSHALL DANN
Attesting Officer                    Commissioner of Patents